United States Patent [19]
Schwarz

[11] 3,811,473
[45] May 21, 1974

[54] FLUIDIC PRESSURE REGULATOR
[75] Inventor: Robert Schwarz, Oakland, Calif.
[73] Assignee: Rockwell International Corporation, El Segundo, Calif.
[22] Filed: Apr. 14, 1969
[21] Appl. No.: 815,734

[52] U.S. Cl. .............................. 137/810, 137/814
[51] Int. Cl. ......................... F15c 1/12, F15c 1/16
[58] Field of Search................... 137/81.5; 73/194

[56] References Cited
UNITED STATES PATENTS

| | | | |
|---|---|---|---|
| 3,473,545 | 10/1969 | Boyadjieff........................ | 132/81.5 |
| 3,565,091 | 2/1971 | Auger................................ | 132/81.5 |
| 3,276,259 | 10/1966 | Bowles et al.................... | 137/81.5 X |
| 3,472,255 | 10/1969 | Fox et al.......................... | 137/81.5 |
| 3,486,521 | 12/1969 | Mayer............................... | 137/81.5 |
| 3,489,009 | 1/1970 | Rimmer........................... | 137/81.5 X |
| 3,517,685 | 6/1970 | Eastman.......................... | 137/81.5 |
| 3,537,466 | 11/1970 | Chapin.............................. | 137/81.5 |

*Primary Examiner*—Samuel Scott
*Attorney, Agent, or Firm*—Robert M. Sperry

[57] ABSTRACT

In a fluid system, an in-line vented jet is disclosed whose vent is controlled by a vortex valve. Since the control ports of the vortex valve are coupled to a constant upstream pressure any variance in downstream impedance effecting said vent cavity pressure is immediately counter-acted by the vortex valve which acts as a rough pressure regulator for the vented jet cavity, thus maintaining constant pressure recovery regardless of downstream flow changes.

6 Claims, 3 Drawing Figures

FLUIDIC PRESSURE REGULATOR

CROSS-REFERENCE TO RELATED APPLICATIONS

A co-pending application assigned to the same assignee of this application, Ser. No. 766,097, entitled, "Fluid Vent Valve," filed Oct. 9, 1968, and now abandoned relates to a means to vent overpressures in a fluid system by utilizing a vortex valve.

BACKGROUND OF THE INVENTION

Conventional presure regulators responsive to a change of downstream flow are usually mechanically actuated. For example, piston balanced systems, well known in the art, are commonly used as a means to regulate pressure. Pressure responsive poppet, gate and butterfly valves are examples of other types of mechanically actuated pressure regulators. All of the aforementioned devices have moving mechanical members subject to wear and mechanical failure which subsequently leads to inaccurate or widely variant response to variations in delivered flow. There is no means in the prior art to effectively isolate a flow source from a downstream variable load whereby a constant flow is maintained despite constantly changing load impedance or resistance. Therefore, it is an object of this invention to provide a pure fluid pressure regulator using fluidic techniques that require no moving parts, exhibits a high flow recovery rate and is insensitive to downstream pressure changes. The regulator of the present invention can be used wherever it is desirable to isolate the effects of a variable load on a pressure flow source.

SUMMARY OF THE INVENTION

The pressure regulator of the present invention utilizes a vented jet whose vent cavity pressure is controlled by a vortex valve. Output pressure is maintained despite a change in downstream load impedance. The nozzle of the vented jet is choked while the receiver section opposite the nozzle has diverging walls designed to achieve the greatest pressure recovery range. In order to maintain constant output pressure it is necessary that the vented jet maintain an uninterrupted sonic flow. In order to assure that the nozzle remains sonic over a wide flow demand range, vent cavity pressure must also be maintained relatively constant. The vent cavity of the vented jet is connected to the inlet of a vortex valve. A constant vortex valve control flow is established by supplying the control nozzles of the vortex valve with constant inlet supply flow tapped from the main supply flow into the vented jet.

In operation, if downstream impedance or resistance decreases, the output flow from the vented jet increases, thus decreasing the vent cavity flow which is continuously being dumped through the vortex valve. Since the supply flow to the control nozzles of the vortex valve is constant, a decrease in vent pressure results in a reduced flow through the vortex valve, thus resisting any decrease in vent cavity pressure, thereby maintaining pressure recovery of the vented jet over a greater flow demand range.

Advantages over the prior art is the extreme ruggedness of the regulator, its simplicity and freedom from frictional wear. Further, the pressure regulator isolates the flow source from a varying downstream flow demand while maintaining a constant output pressure.

DESCRIPTION OF THE DRAWINGS

The above noted objects and further advantages of the instant invention will be more fully understood upon study of the following detailed description in conjunction with the detailed drawings in which:

Referring now to FIG. 1 the pressure regulator generally designated as 10 comprises a vented jet 12 whose vent cavity 18 is in communication with vortex valve 22. The vented jet is fed by a constant pressure supply fluid 11 through port 19. The same supply fluid is also directed through conduits 29, 29' to the control ports 30, 30' of vortex valve 22. Supply fluid 11 enters choked nozzle 14 which directs a sonic flow into receiver 16 which subsequently is fed into, for example, tank 15. Within tank 15 is an explusion bladder 17 which deforms under pressure causing fluid to be expelled out of the tank at exit 28. The object of the fluidic pressure regulator is to provide a constant pressure to the bladder 17 despite changes in volume. It can be seen that when the bladder is in position A, the valve 25 is closed and system impedance is high as seen at the receiver section 16. This causes the excess flow to spill into vent cavity 18. Since supply flow is constant the flow past the control ports 30, 30' of vortex valve 22 is constant therefore the increased flow in vent cavity 18 escapes down conduit 21 past the control ports 30, 30' and out through exit 23, 23' as indicated by the flow depicted by the enlarged arrow A' exiting the vortex valve. As system impedance is decreased by opening valve 25, the outflow from the vent cavity 18 is lessened therefore, less flow is vented through exits 23, 23' as indicated by the smaller, super imposed, arrow D'. Therefore it can be seen that pressure is maintained relatively constant on bladder 17 despite its position or rate of movement within the tank and the vented jet is also maintained within a desirable pressure recovery region because of its coupling to the vortex valve 22. This phenomena will be explained more fully in FIG. 2.

FIG. 2 is a more detailed schematic cross-section of the vented jet 12 in communication with vortex valve 22. The vortex valve is rotated 90° from the position shown on FIG. 1 and a section is taken therethrough to more clearly show how the device operates. To maintain vented jet operation in the high pressure recovery region wherein the pressure at the outlet of the vented jet 12 is approximately equal the pressure of the inlet despite changes in downstream impedance the vent cavity 18 must be maintained within a predetermined range. When flow load 13 changes, the change is sensed by the vortex valve. If the load flow increases, flow into the vortex valve from the vent cavity tends to decrease. This results in an increase in the resistance to flow of the vortex valve, thus resulting in a decrease in the vent cavity pressure which is proportionately much less than the decrease in vortex valve flow. The opposite phenomenon occurs when the load flow increases, thus the vent cavity pressure is kept within a relatively narrow range despite wide variations in load flow.

In a typical vented jet, a sonic jet of fluid is exhausted into a vent cavity. Flow and pressure recovery by the diffuser or receiver section is controlled by the pressure in the vent cavity. It has subsequently been determined that if the spacing between the jet (14) and the receiver (16) is fairly close (less than the jet diameter) and if the vent pressure within the vent cavity (18) is not allowed to drop below 40 percent of supply pressure, then a very large portion of the velocity head of the supply jet is recovered in the receiver (16). To maintain the vent cavity pressure above 40 percent of supply pressure the inlet of a vortex valve is coupled to the vent cavity of the vented jet. As seen in FIG. 2, the design of the receiver section (diverging walls) is also important to gain maximum pressure-flow recovery. The following parametric ranges are pertinent to the successful operation of the flow regulator of the present invention. For example, the relationship of the choked supply nozzle 14 ($d_s$) to the receiver section 16 ($d_r$) is expressed as $d_r/d_s$ and this ratio can be 0.9 − 1.2. While the spacing (1g) between nozzle 14 and receiver 16 is expressed as 1g/ds and this ratio can be 0.3 − 1.0. As a rule of thumb the distance between the nozzle and receiver must be slightly less than the nozzle opening. The angle of the diverging walls of receiver section 16 ($\theta$) can be 5°–20° to assure maximum pressure recovery. The area of the supply nozzle 14 is equal to $\pi d_s^2/4$ which equals 0.25 − 0.5 times the total vortex valve exit port (23, 23'). When the above tolerances are maintained the vortex valve will dump pressure in the vent cavity when the pressure reaches a point just above 40 percent of supply pressure.

Figure 1:
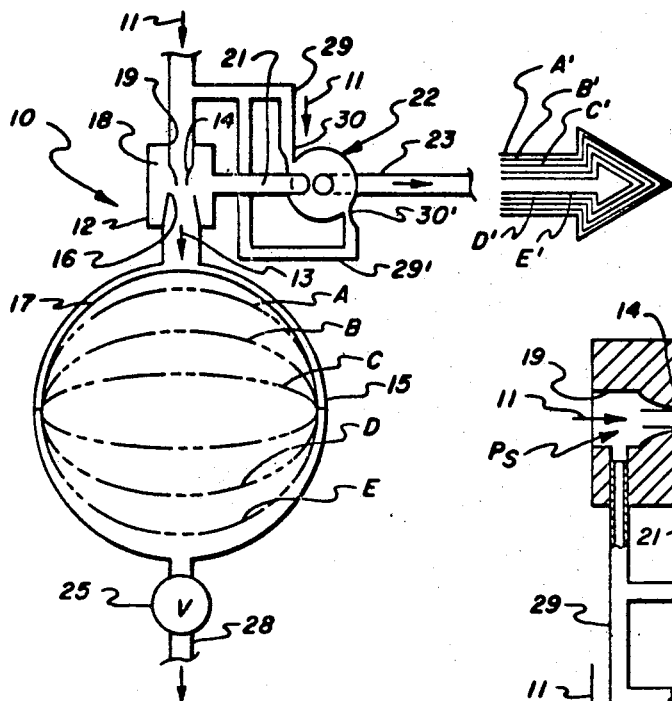
FIG. 1 is a schematic view of a basic fluid system having a varying output fluid pressure source.
Figure 2:
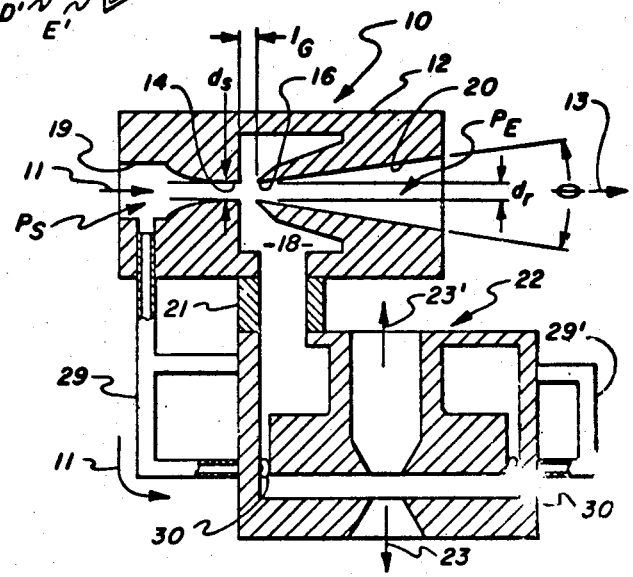
FIG. 2 is an enlarged schematic view of the vented jet with a vortex valve in communication with the vented jet cavity.

Briely stated, the vortex valve responds to small variations in pressure from a supply source in this case, vent cavity pressure. The vortex valve 22 exhibits highly non-linear properties and is ideally suited to closely control vent cavity pressures within a predetermined range, in this example, above 40 percent of supply pressure.

The vortex valve employed in this application is described with detail in copending application entitled, "Fluid Vent Valve" assigned to the same assignee of this application, U.S. Ser. No. 766,097, filed on Oct. 9, 1968, which copending application is incorporated herein by reference.

The fluidic pressure regulator 10, in operation, performs in the following manner; Assume a fluid, for example, at 200 psia is introduced into port 19 of the vented jet 12. The same fluid, at 200 psia, is directed via conduits 29, 29' into control ports 30, 30' of the vortex valve 22. When the load impedance is constant the pressure within cavity 18 is constant and little or no change or variation of vent cavity flow past control ports 30, 30' of the vortex valve occurs. However, if variable flow load 13 should decrease (increase in impedance) the pressure within cavity 18 begins to build up. If this pressure were allowed to build up unchecked, then the sonic flow between nozzle 14 and receiver 16 will break down causing a change in pressure in the receiver section thereby causing a loss of pressure regulation in the system. Before this can happen, as the pressure in cavity 18 builds up, the control flow through ports 30, 30' becomes much less effective in restricting flow from the vent cavity; i.e., the impedance of the vortex valve drops thus allowing a much higher flow rate from the cavity 18 without the vent cavity pressure building up too much.

The variation in impedance of the vortex valve 22 as a function of vent cavity pressure allows the valve, for suitable design parameters, to keep the vent cavity pressure between approximately 40 and 50 percent of the supply pressure 11. The low end of this range is still high enough to maintain the pressure recovery in the receiver 16 while the high end is low enough to avoid following the nozzle 14 to go subsonic thus avoiding loss of regulation due to poor pressure recovery in the receiver 16 (too low vent pressure) and loss of regulation due to variations in the source pressure (too high vent pressure and a subsonic nozzle).

Figure 3:
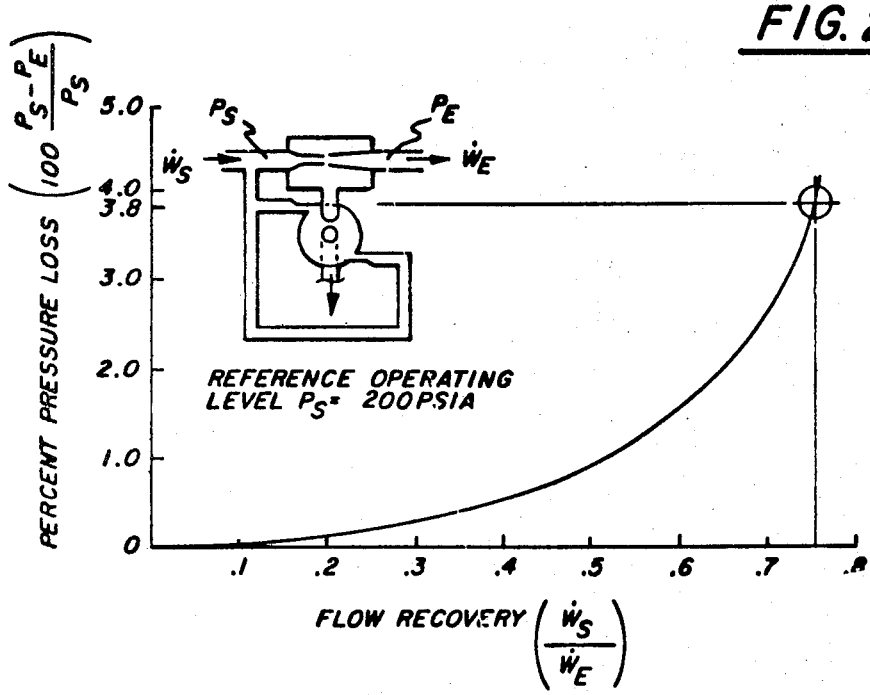
FIG. 3 is a graph which illustrates constant pressure recovery despite changes in output flow.

FIG. 3 is a graph which illustrates the percent of pressure recovery during a change in output flow. For example, using a fluid at 200 psia as a supply ($P_s$) at the inlet of the vented jet and at the control ports of the vortex valve pressure recovery decreases only 3.8 percent for flow recoveries approaching 75 percent. Thus a significant variation in output flow can occur without a significant change in output pressure thereby effectively providing pressure regulation while, at the same time, separating the constant supply flow from a fluctuating output flow load.

Although particular embodiments have been chosen to best illustrate the advantages of this invention, it is to be understood that the scope of the invention is not to be limited thereby:

I claim:

1. A pure fluidic pressure regulator system for regulating flow in a line downstream of said regulator comprising;

a relatively constant pressure main fluid supply source, a regulator housing, inlet means in said housing in fluid communication with said fluid supply source, means forming a chamber within said regulator housing in axial alignment with said inlet means, a first conduit means having a reduced cross-section at an open end thereof between said inlet means and said chamber forming a sonic nozzle exiting into said chamber, a second conduit means in said housing extending into said chamber, an end of said second conduit means being axially aligned with and spaced a distance from said first conduit means in said chamber to receive fluid from said first conduit means, an in-line outlet means extending from said second conduit means connectable to a downstream variable impedance, and a vortex valve having an inlet connectively coupled to said chamber peripherally of said second conduit means to convey excess of fluid not exiting said outlet means, a dump port and a control port, the control port of said vortex valve being in fluid communication with said chamber inlet means and said relatively constant pressure main fluid supply source whereby any change of pressure downstream of said second conduit means and said outlet means is communicated to said chamber and causes a change in excess fluid flow through said vortex valve inlet and across said control port, said control port permitting variable dump flow to said dump port from said chamber, thereby maintaining pressure in said chamber within controlled limits assuring a relatively constant pressure through said pressure regulator despite variations in downstream load impedance.

2. The invention of claim 1 wherein the ratio of the diameters of said nozzle within said chamber divided by the diameter of the spaced end of said second conduit means within said chamber is from 0.9 to 1.2.

3. The invention of claim 1 wherein the ratio of the spaced distance between the axially aligned ends of said first and second conduit means within said chamber divided by the diameter of said nozzle is from 0.3 to 1.0.

4. The invention of claim 1 wherein the ratio of the area of said nozzle is equal to 0.25 to 0.5 times the total vortex valve dump port area.

5. The invention of claim 1 wherein said second conduit means adjacent said first conduit means comprises a tubular pipe having walls that diverge outwardly from said spaced end within said chamber.

6. The invention of claim 5 wherein the angle of said diverging walls is from 5° to 20°.

* * * * *